(12) United States Patent
Majjiga

(10) Patent No.: US 12,335,097 B2
(45) Date of Patent: Jun. 17, 2025

(54) SYSTEM AND METHODS FOR AUTOMATING DEPLOYMENT OF NETWORK CONFIGURATIONS

(71) Applicant: Verizon Patent and Licensing Inc., Basking Ridge, NJ (US)

(72) Inventor: Deepak Majjiga, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 40 days.

(21) Appl. No.: 18/312,156

(22) Filed: May 4, 2023

(65) Prior Publication Data

US 2024/0372783 A1    Nov. 7, 2024

(51) Int. Cl.
*H04L 41/0895* (2022.01)
*H04L 41/0806* (2022.01)

(52) U.S. Cl.
CPC ...... *H04L 41/0895* (2022.05); *H04L 41/0806* (2013.01)

(58) Field of Classification Search
CPC . H04L 41/40; H04L 41/0806; H04L 41/5009; H04L 41/0886; H04L 41/0873; H04L 41/0883; H04L 41/084
See application file for complete search history.

(56) References Cited

U.S. PATENT DOCUMENTS

| | | | |
|---|---|---|---|
| 2020/0084091 A1* | 3/2020 | Iovene | H04L 47/83 |
| 2022/0029930 A1* | 1/2022 | Yilma | H04L 41/12 |
| 2022/0052929 A1* | 2/2022 | Priya | H04L 41/5051 |

FOREIGN PATENT DOCUMENTS

| | | | | |
|---|---|---|---|---|
| CN | 109586938 B | * | 10/2020 | H04L 41/0843 |
| WO | WO-2018196651 A1 | * | 11/2018 | G06F 9/455 |

OTHER PUBLICATIONS

V. Riccobene, M. J. McGrath, M.-A. Kourtis, G. Xilouris and H. Koumaras, "Automated generation of VNF deployment rules using infrastructure affinity characterization," 2016 (Year: 2016).*
Consonni, V., Todeschini, R., Pavan, M., & Gramatica, P. (2002). Structure/response correlations and similarity/diversity analysis by Getaway descriptors. 2. application of the novel 3D molecular descriptors to QSAR/QSPR studies. (Year: 2002).*

(Continued)

*Primary Examiner* — Messeret F Gebre

(57) ABSTRACT

Systems and methods described herein enable a runtime orchestration platform to deploy network configurations without degrading network performance or causing a network outage. According to one implementation, a network device receives a linked descriptor for deploying a network configuration in a network. The linked descriptor includes a first artifact associated with the network configuration, a unique artifact identifier for the first artifact, a network level identifier for the first artifact, and a link identifier of one or more second artifacts that are associated with the network configuration. The link identifier corresponds to a different network level than the network level identifier for the first artifact. The network device determines, based on information in the linked descriptor, if deployment of the first artifact will cause performance degradation in the network and prevents deployment of the network configuration when deployment of the first artifact will cause performance degradation in the network.

20 Claims, 7 Drawing Sheets

(56) References Cited

OTHER PUBLICATIONS

W. S. Atoui, I. G. B. Yahia and W. Gaaloul, "Poster: Word embedding for deployment descriptors in NFV," 2020 IFIP Networking Conference (Networking), Paris, France, 2020, pp. 625-627 (Year: 2020).*

* cited by examiner

SYSTEM AND METHODS FOR AUTOMATING DEPLOYMENT OF NETWORK CONFIGURATIONS

BACKGROUND

A Fifth Generation (5G) core network supports and manages 5G radio access networks (RANs) that include base stations, providing various services and enabling connections to other networks (e.g., connections to the Internet, etc.). Different types of services may be implemented using network slicing. Network slicing is a form of virtual network architecture that enables multiple logical networks to be implemented on top of a common shared physical infrastructure using software defined networking (SDN) and/or network function virtualization (NFV). Each logical network, referred to as a "network slice," may encompass an end-to-end virtual network with dedicated storage and/or computation resources and may be configured to implement a different set of requirements. To implement functionality such as network slicing, a 5G core network may include various network nodes, known as network functions (NFs). As the number of different NF types and deployed instances of each NF continues to increase, the use of virtualized NFs (VNFs) or containerized NFs (CNFs) has become more prevalent.

DETAILED DESCRIPTION

The following detailed description refers to the accompanying drawings. The same reference numbers in different drawings may identify the same or similar elements.

Software-defined networking (SDN) and/or network function virtualization (NFV) may allow network functions (NFs) of a wireless telecommunications network to execute from reconfigurable resources of function-agnostic hardware. In frameworks for onboarding and deployment of virtualized networks, the constituents of a network are defined by onboarded network slice (NS) and virtual network function (VNF) packages and their descriptors (e.g., NS descriptors (NSDs) and VNF descriptors (VNFDs)). Runtime information (RTI) acting on selected packages/descriptors produce instances and connectivity that make up the actual deployed network (e.g., a network slice).

Deployment of a VNF or CNF involves infrastructure configuration (e.g., cloud, transport, etc.) and application configuration, typically using configuration files that are shared with network operators. These configuration files may be in different forms (e.g., a spreadsheet, YAML, JavaScript Object Notation (JSON), ANSIBLE, PYTHON, etc.), obtained from inter-organizational cross-functional teams and external (non-organizational) sources, such as suppliers. The configuration files/data may include, for example, location or site-specific information for a NF deployment and "artifacts." For example, a specific configuration design may include the necessary site-specific artifacts to enable immediate deployment by a deployment system. However, the service designer and/or service orchestrator may not be aware of dependencies between different artifacts, such as what artifacts are associated with each network component, how the components are linked to each other, or their sequential dependency among each other and on an application. Configurations without cognizance of network artifacts may result in either degraded network performance or even a complete outage.

Systems and methods described herein enable automated deployment of network configurations (e.g., a single network configuration, a set of network configurations, a network slice, etc.) without degrading network performance or causing a network outage. A linked descriptor, referred to herein as a Linked Network Descriptor Template (LNDT), is introduced to model all artifacts for a deployment of a VNF, CNF, etc. The LNDT may be used to link different descriptors and parts of different artifacts in a desired way which can be processed by orchestration tools. A new microservice is included with every orchestration tool in the deployment chain to process the LNDT and take action based on a series of cumulative decisions described further herein. The systems and methods may better enable automated deployments of VNFs and provide cognitive service assurance actions to avoid network performance degradation or outages.

Figure 1:
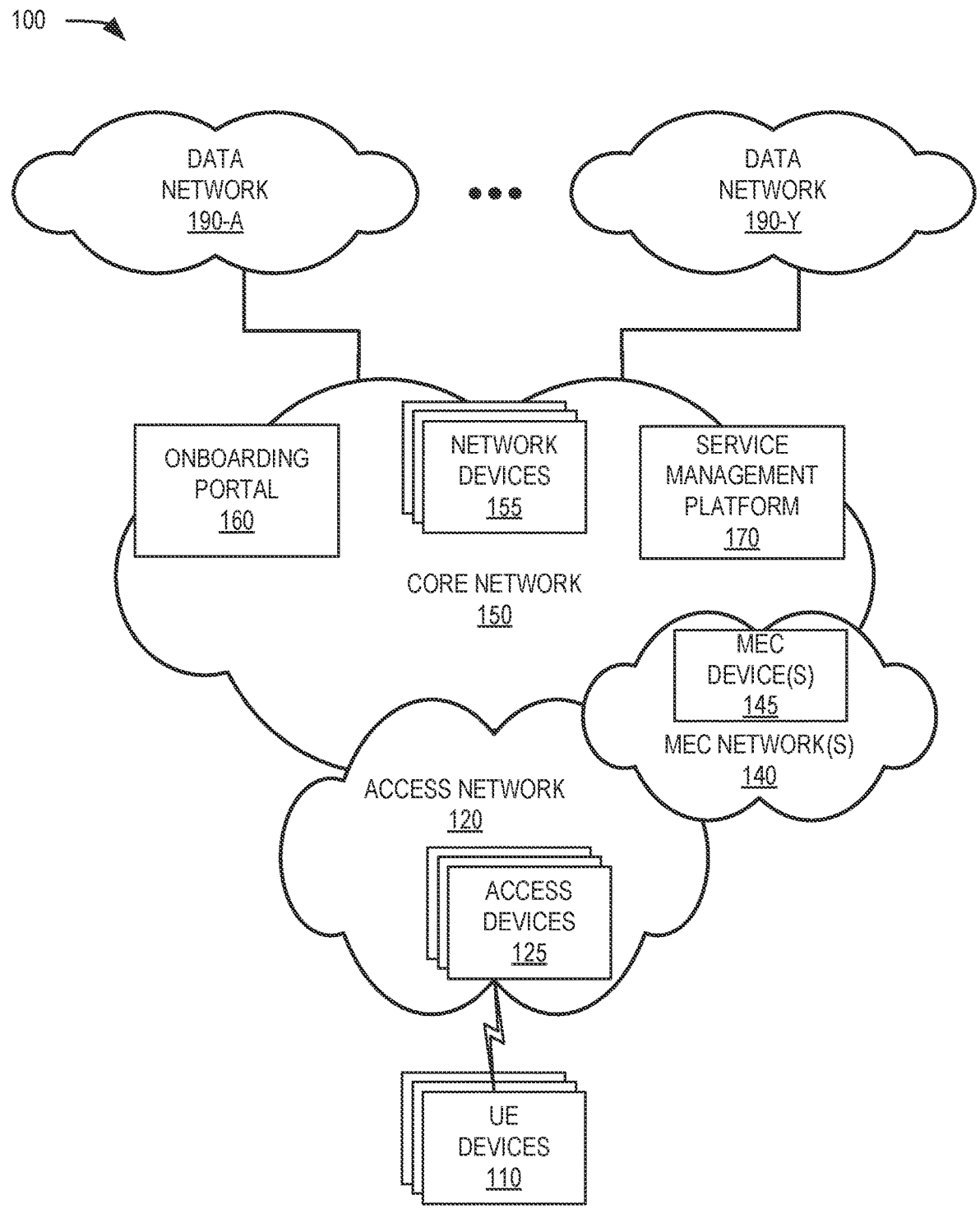
FIG. 1 is a diagram illustrating an exemplary network environment in which an automated slice configuration service described herein may be implemented.

FIG. 1 is a diagram of an exemplary environment 100 in which the systems and/or methods described herein may be implemented. As shown in FIG. 1, environment 100 may include User Equipment (UE) devices 110 (also referred to as UEs 110), an access network 120 that includes access devices 125, multi-access edge computing (MEC) networks 140 that include MEC devices 145, a core network 150 that includes network devices 155, an onboarding portal 160, and a service management platform 170, and data networks (DNS) 190-A to 190-Y (referred to herein collectively as "DNs 190" and individually as "DN 190").

UE device 110 may include a device with cellular wireless communication functionality. For example, UE device 110 may include a handheld wireless communication device (e.g., a smart phone, etc.), a wearable computer device (e.g., a wristwatch computer device, etc.), a computer; a Wi-Fi® access point, a portable gaming system, an Internet-of-Things (IoT) device, and/or any other type of computer device with wireless communication capabilities. UE device 110 may include capabilities for voice communication, mobile broadband services (e.g., video streaming, real-time gaming, premium Internet access etc.), best effort data traffic, and/or other types of applications.

Access network 120 may include a Radio Access Network (RAN) or other type of network to connect UE devices 110 to other networks (e.g., MEC network 140, core network 150, etc.). Access network 120 may include an access device 125, which may comprise a 5G New Radio (NR) base station (e.g., a gNodeB) and/or a Fourth Generation (4G) Long Term Evolution (LTE) base station (e.g., an eNodeB). Each access device 125 may include devices and/or components configured to enable cellular wireless communication with UE devices 110. For example, access device 125 may include a radio frequency (RF) transceiver configured to communicate with UE devices 110 using a 5G NR air interface using a 5G NR protocol stack, a 4G LTE air interface using a 4G LTE protocol stack, and/or using another type of cellular air interface. Access device 125 may enable communication with core network 150 to enable core network 150 to authenticate UE device 110.

Access network 120 may enable UE devices 110 to connect to core network 150 via access devices 125 using cellular wireless signals. For example, access network 120 may include one or more central units (Cus) and distributed units (Dus) (not shown in FIG. 1) that enable and manage connections from access device 125 to core network 150. Access network 120 may include features associated with an LTE Advanced (LTE-A) network and/or a 5G core network or other advanced network, such as management of 5G NR base stations; carrier aggregation; advanced or massive multiple-input and multiple-output (MIMO) configurations (e.g., an 8×8 antenna configuration, a 16×16 antenna configuration, etc.); relay stations; Heterogeneous Networks (HetNets) of overlapping small cells and macrocells; Self-Organizing Network (SON) functionality; Machine-type Communications (MTC) functionality, such as 1.4 Megahertz (MHz) wide enhanced MTC (eMTC) channels (also referred to as category Cat-M1), Low Power Wide Area (LPWA) technology such as Narrow Band (NB) IoT (NB-IoT) technology, and/or other types of MTC technology; and/or other types of LTE-A and/or 5G functionality.

Each MEC network 140 may be associated with one or more access devices 125 and may provide MEC services for UE devices 110 attached to the one or more access devices 125. MEC network 140 may be in the proximity of one or more access devices 125 from a geographic and network topology perspective, thus enabling low latency communication with UE devices 110 and/or access devices 125. As an example, MEC network 140 may be located on a same site as one of the access devices 125. As another example, MEC network 140 may be geographically closer to access devices 125 and reachable via fewer network hops and/or fewer switches than other access devices 125. As yet another example, MEC network 140 may be reached without passing through a gateway device, such as a 4G Packet Data Network Gateway (PGW) or a 5G User Plane Function (UPF).

MEC network 140 may include one or more MEC devices 145. MEC devices 145 may provide MEC services to UE devices 110, such as, for example, content delivery of streaming audio and/or video, cloud computing services, authentication services, etc. In some implementations, MEC devices 145 may host deployed VNFs used to implement particular network slices. Thus, MEC devices 145 may form part of an infrastructure for hosting network slices.

Core network 150 may be managed by a provider of cellular wireless communication services and may manage communication sessions of subscribers connecting to core network 150 via access network 120. For example, core network 150 may establish an Internet Protocol (IP) connection between UE devices 110 and DN 190. In some implementations, core network 150 may include a 5G core network. A 5G core network may include devices that implement network functions that include, among others, an Access and Mobility Function (AMF); a Session Management Function (SMF); a UPF; an Application Function (AF) to provide services associated with a particular application; a Unified Data Management (UDM); and a Network Slice Selection Function (NSSF). In other implementations, core network 150 may also include a 4G LTE core network (e.g., an evolved packet core (EPC) network).

Core network 150 may include network devices 155. Network device 155 may include a 5G NF; a 4G network node; a transport network device, such as, for example, a switch, router, firewall, gateway, an optical switching device (e.g., a reconfigurable optical add-drop multiplexer, etc.), and/or another type of network device. Network device 155 may include a physical function node or a VNF. Thus, the components of core network 150 may be implemented as dedicated hardware components and/or as VNFs implemented on top of a common shared physical infrastructure using Software Defined Networking (SDN). For example, an SDN controller (e.g., in service management platform 170) may implement one or more of the components of core network 150 using an adapter implementing a VNF virtual machine, a Containerized Network Function (CNF), an event driven serverless architecture interface, and/or another type of SDN architecture. The common shared physical infrastructure may be implemented using one or more devices 600 described below with reference to FIG. 6 in a cloud computing center associated with core network 150. Additionally, or alternatively, some or all of the common shared physical infrastructure may be implemented using one or more devices 600 included in MEC device 145. Sets of network devices 155 and/or MEC devices 145 may be organized, for example, into different network slices.

Onboarding portal 160 may include one or more computer devices, such as server devices, to process orders for network services. For example, a customer, such as a business organization and/or government entity may request a service for which a new network slice is to be deployed. As an example, a business may request a communication service associated with a quality of service (QOS) and may request data traffic separation for the service, resulting in onboarding portal 160 sending a request (to admit a new network slice in core network 150 and/or access network 120) to service management platform 170.

Service management platform 170 may include one or more computer devices to manage the provisioning and/or configuration of VNFs in core network 150, MEC network 140, and/or access network 120. Service management platform 170 may provide orchestration at a high level, with an end-to-end view of the infrastructure, at a network level (e.g., access network 120, MEC network 140, and core network 150), and at an application level. According to an implementation, service management platform 170 may include a service orchestrator to automate sequences of activities, tasks, rules, and policies needed for deployment, modification, or removal of VNFs and VNF instances. According to implementations described herein, nodes (e.g., network devices or functions) in service management platform 170 may be equipped with LNDT processors (e.g., a microservice) to interpret and apply LNDTs.

DNs 190 may each include a data network. A particular DN 190 may be associated with an Access Point Name (APN) and UE device 110 may request a connection to the particular DN 190 using the APN. DN 190 may include, and/or be connected to and enable communication with, a local area network (LAN), a wide area network (WAN), a metropolitan area network (MAN), an autonomous system (AS) on the Internet, an optical network, a cable television network, a satellite network, a wireless network (e.g., a CDMA network, a general packet radio service (GPRS) network, and/or an LTE network), an ad hoc network, a telephone network (e.g., the Public Switched Telephone Network (PSTN) or a cellular network), an intranet, or a combination of networks.

Although FIG. 1 shows exemplary components of environment 100, in other implementations, environment 100 may include fewer components, different components, differently arranged components, or additional components than depicted in FIG. 1. Additionally, or alternatively, one or more components of environment 100 may perform functions described as being performed by one or more other components of environment 100.

Figure 2:
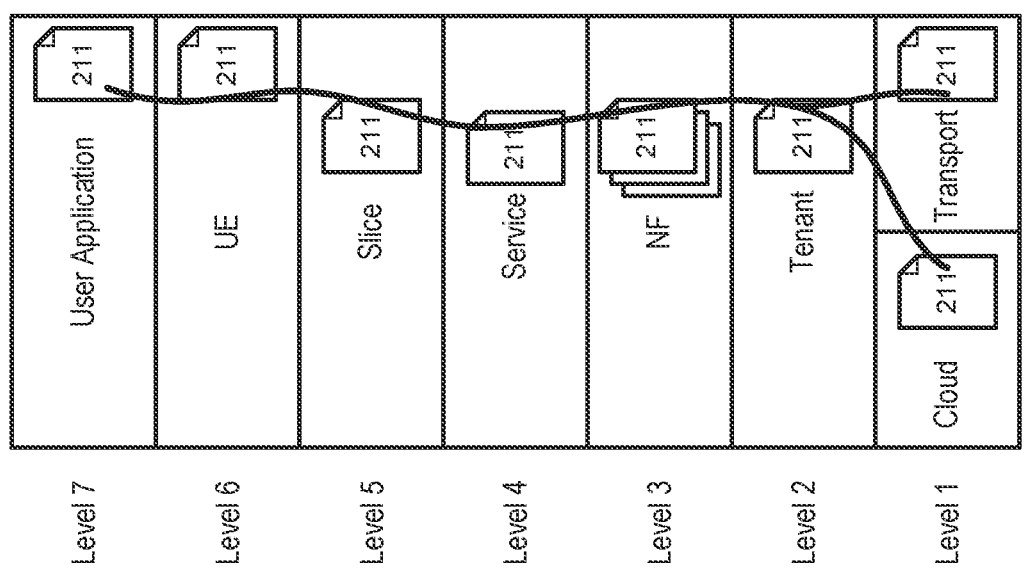
FIG. 2 is a diagram illustrating concepts describe herein.

FIG. 2 is a diagram illustrating concepts described herein. As shown in FIG. 2, a VNF or CNF deployment involves configurations at different network levels that relate to: infrastructure (e.g., cloud platform and transport) configurations (Level 1), tenant configuration (Level 2), network function (NF) configuration (Level 3), service configuration (Level 4), slice configuration (Level 5), UE configuration (Level 6), and user application configuration (Level 7). Each configuration level may have certain artifacts that can impact the configuration and network performance of other levels.

LNDTs 211 provides a mechanism to model and link configuration artifacts for each level (e.g., infrastructure, tenant, NF, service, slice, UE, and user application artifacts) in a NF deployment. Orchestration and other devices in each level may be configured with a microservice to interpret, manage, process, update, and/or share the LNDTs 211. Although FIG. 2 provides an illustration of one arrangement of network levels, other embodiments may include different levels in other arrangements (e.g., more levels, fewer levels, etc.).

Figure 3:
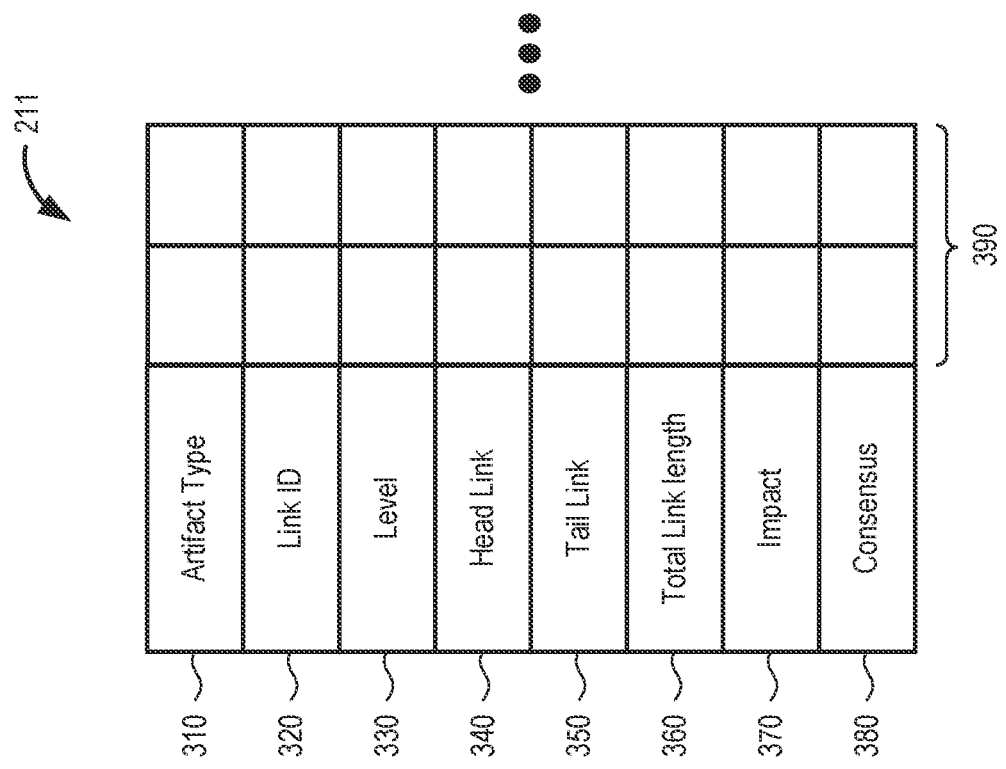
FIG. 3 is a block diagram of exemplary data fields in a Linked Network Descriptor Template (LNDT), according to an implementation.

FIG. 3 is a diagram illustrating exemplary fields of a LNDT 211, according to an implementation. As shown in FIG. 3, LNDT 211 may include an artifact type field 310, a link ID field 320, a level field 330, a head link field 340, a tail link field 350, a total link length field 360, an impact field 370, a consensus field 380, and a variety of entries 390.

Artifact type field 310 may identify the type of artifact in a particular LNDT. For example, an LNDT may identify an NF artifact, cloud artifact, transport artifact, application artifact, service artifact, etc. Link ID field 320 may include a unique identifier that represents the artifact in the network (e.g., network environment 100). Level field 330 may include an indication/identifier (e.g., L1, L2, L3, etc.) for the network level the artifact (i.e., with the corresponding Link ID in Link ID field 320) will be configured in the network. For example, using the levels described in FIG. 2, level field 330 may include a level indication of 1 through 7. In other implementations, different network level divisions and indicators may be used.

Head link field 340 may include a different link ID of a different artifact associated with a next higher level for a deployment. For example, a level 3 artifact would have a head link for a level 4 artifact. Tail link field 350 may include a different link ID of a different artifact associated with a next lower level for a deployment. For example, a level 3 artifact would have a tail link for a level 2 artifact. Total link length field 360 may indicate the total number of levels (e.g., up to seven levels or more depending on the network configuration) impacted by the NF deployment.

Impact field 370 may include an impact level (e.g., None, Low, Medium, High, etc.) for the artifact corresponding to Link ID field 320 due to dependencies. For example, a change in a Level 1 configuration would likely result in a high impact, while a change in a Level 7 configuration may have no network impact. Accordingly, a change in a Level 4 artifact may have a medium impact, while a change in a Level 5 artifact may have low impact. As described further herein, an impact analyzer in a LNDT processor may assess impacts and update impact levels as lower level dependencies are confirmed/resolved.

Consensus field 380 may be a binary indicator (e.g., Full or Null) indicating there is consensus from other levels or links to move ahead with an artifact deployment. According to one implementation, before applying any artifacts, a LNDT processor (e.g., in a service orchestrator) may require consensus (e.g., at least 80%, 60%, 50% in agreement) from all levels or links.

An LNDT 211 may include a separate entry 390 for each artifact (e.g., a unique Link ID for each artifact). LNDT 211 may include multiple entries/artifacts. Although FIG. 3 illustrates exemplary fields for LNDT 211, in other implementations LNDT 211 may include fewer, different, or additional fields than depicted in FIG. 3.

Figure 4:
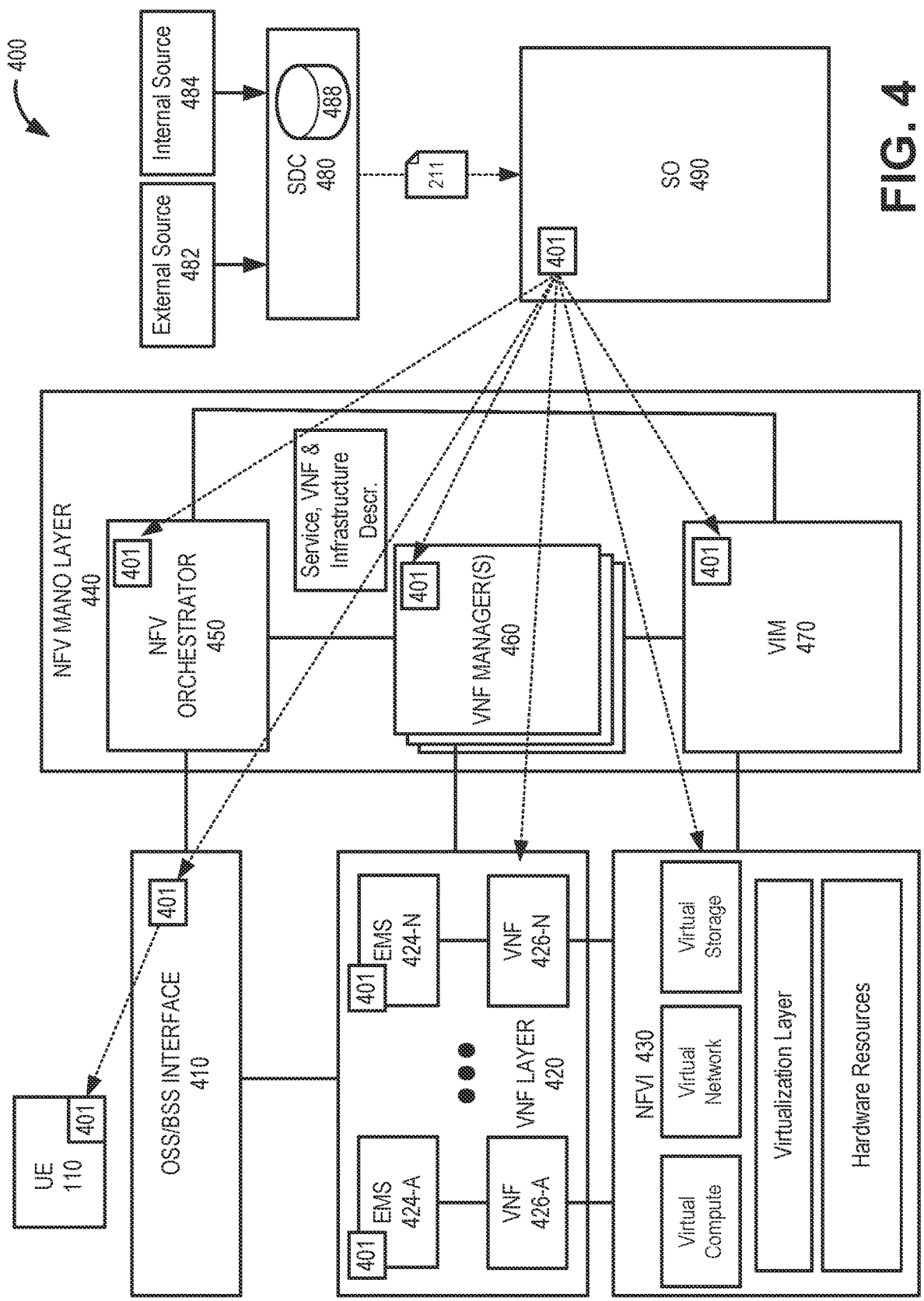
FIG. 4 is a diagram illustrating a slice orchestration platform, according to implementations described herein.

FIG. 4 is a diagram illustrating exemplary functional components of an NFV architecture system 400 using LNDTs 211. The functional components of NFV architecture system 400 may be implemented, for example, via processor (e.g., processor 610, FIG. 6) executing instructions from memory 615 on one or more devices 600 included in network environment 100. As shown in FIG. 4, NFV architecture system 400 may include operations support system/business support system (OSS/BSS) 410, a VNF layer 420, an NFV Infrastructure (NFVI) 430, and an NFV MANO layer 440. Each of OSS/BSS 410, VNF layer 420, NFVI 430, and NFV MANO layer 440 may include at least one instance of a microservice, referred to herein as an LNDT processor 401, to process LNDTs.

OSS/BSS 410 may include an OSS and/or BSS. The OSS may include a network monitoring system, a network provisioning system, a network management system, a self-optimizing network (SON) system, etc. The BSS may include an ordering system, a customer service system, and/or a billing system. OSS/BSS 410 may manage the physical components of access network 120, MEC network 140, and/or core network 150.

VNF layer 420 may include VNF Managed Objects (MOs). Each VNF MO may correspond to an instance of a VNF MO of a particular type. For example, a VNF MO may include an Element Management System (EMS) 424-A through 424-N and a VNF 426-A through 426-N. For example, if NFV architecture system 400 is used for access network 120, a first VNF MO may correspond to a virtualized gNodeB, a second VNF MO may correspond to a virtualized AMF, a third VNF MO may correspond to a virtualized UPF, etc.

NVFI 430 may include hardware (e.g., processors, memory, storage components, networking components, etc.) and software components on which VNF MOs are deployed. For example, NVFI 430 may include the hardware and software components included in a cloud computing system.

NFV MANO layer 440 may correspond to an ETS NFV MANO architecture. NFV MANO layer 440 may include an orchestrator 450, a VNF manager 460, and a Virtual Infrastructure Manager (VIM) 470. Orchestrator 450 may perform orchestration of NFV to ensure that sufficient resources are available to provide a network service and that a particular network function is deployed, changed, or removed. Thus, orchestrator 450 may coordinate requests received via OSS/BSS 410 with VNF manager 460 and VIM 470.

A service design and creation (SDC) function 480 may receive NF packages from external sources 482 (e.g., onboarding portal 160) and/or internal sources 484, for which network resources can then be designed and configured. Users/designers may use SDC 480 to create services, which may include network service descriptors (NSDs) and LNDTs (e.g., LNDT 211) for particular services. SDC 480 may store the LNDTs in a database (e.g., DB 488). Database 488 may include, for example, a generalized configuration database (e.g., design time data) for runtime orchestration components to resolve NF and slice configuration on-demand during NF deployment. The LNDT may model every artifact for the requested service, such as the NF package, cloud configuration files, transport configurations, in any format such as, ANSIBLE, PYTHON, scripts, gRPC, Network Configuration Protocol (NETCONF), OpenConfig, other proprietary formats, etc. SDC 480 may distribute LNDT 211 to the runtime environment. LNDT 211 may be distributed as a file, a data structure, a database excerpt, a binary package, or another format. For example, a service orchestrator (SO) 490 may obtain LNDT 211.

Service orchestrator 490 may manage creation and configuration of multiple network functions using information from SDC 480. Service orchestrator 490 may receive instructions/LDNTs 211 from SDC 480 to instantiate a VNF and/or network slice. As described further herein, service orchestrator 490 may automate sequences of activities, tasks, rules, and policies needed for on-demand creation and modification of network functions. Service orchestrator 490 may provide orchestration at a high level, with an end-to-end view of the infrastructure, networks (e.g., access network 120, MEC network 140, and core network 150), and applications. Service orchestrator 490 may be responsible for implementing instructions to instantiate, allocate, and activate network slices. According to one implementation, service orchestrator 490 may receive and process an LNDT 211 to determine site-specific artifacts for a NF package deployment at runtime. Service orchestrator 490, along with other network elements in NFV architecture system 400, may include an LNDT processor 401. LNDT processor 401 may parse and act on LNDT 211, as described further, for example, in connection with FIGS. 5 and 6.

UE 110 may run applications or application configurations that are supported by network slice. According to implementations described herein, UE 110 may also include a LNDT processor 401 to manage LNDTs and provide feedback.

Although FIG. 4 shows exemplary components of NFV architecture system 400, in other implementations, NFV architecture system 400 may include fewer components, different components, additional components, or differently arranged components than depicted in FIG. 4. For example, in other implementations, environment 100 may include components to support an Open Network Automation Platform (ONAP). Additionally, or alternatively, one or more components of NFV architecture system 400 may perform one or more tasks described as being performed by one or more other components of NFV architecture system 400.

Figure 5:
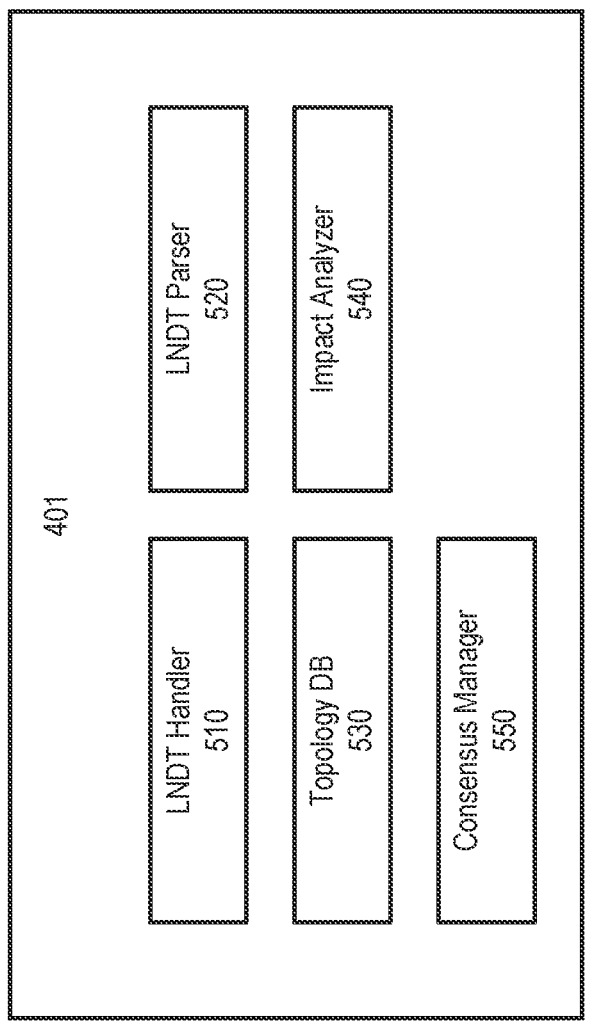
FIG. 5 is a block diagram illustrating example logical components of a LNDT processor, according to an implementation.

FIG. 5 is a diagram illustrating example logical components of LNDT processor 401. As shown in FIG. 5, LNDT processor 401 may include an LNDT handler 510, a LNDT parser 520, a topology database 530, an impact analyzer 540, and a consensus manager 550.

LNDT handler 510 may receive an LNDT 201 with deployment instructions for the runtime environment. LNDT handler 510 may initiate parsing/storage of LNDT data and assign validated artifacts to other network nodes for action, deployment, configurations, or any other life cycle management (LCM) or advanced LCM operations.

LNDT parser 520 may parse LNDT 211, extract artifacts, and store the artifacts/files topology database 530. Artifacts may be stored associated by link IDs (e.g., from link ID field 320) and levels (e.g., from level field 330) so as to create a graph topology of all the artifacts.

Topology database 530 may store the graph topology of artifacts based on input from LNDT parser 520.

Impact analyzer 540 may retrieve an artifact from topology database 530 (e.g., using either a push or pull mechanisms) and analyze the impact of the deployment and/or configuration of the artifact on the overall network. For example, impact analyzer 540 may read an entry in artifact type field 310 to determine what impact level is assigned to an artifact configuration (e.g., none, low, medium, high, etc.). For example, impact analyzer 540 may inspect the associated Level in level field 330 and/or artifact type in artifact type field 310 to assess the artifact's potential impact on the overall network. Generally, impact analyzer 540 may assign impact levels based on logic assigning greater impact for lower level (e.g., Level 1 or 2) configuration changes and smaller impact for higher level (e.g., Level 6 or 7) configuration changes.

If the impact level is relatively low (e.g., none or low impact), impact analyzer 540 may forward the artifact (or, alternatively, a link to the artifact) to consensus manager 550. If the impact level is relatively high (e.g., medium or high impact), impact analyzer 540 may review dependencies. For example, using head links (e.g., from field 340) and tail links (e.g., from field 350), impact analyzer 540 may retrieve artifacts of the dependent links from topology database 530 and repeat the impact analysis for the artifacts in the dependent links. If the impact level of an artifact on the dependent links is relatively low, impact analyzer 540 may forward the dependent artifact (or, alternatively, a link to the artifact) to consensus manager 550.

Consensus manager 550 may obtain consensus for a configuration decision from other systems in NFV architecture system 400. For example, consensus manager 550 may send the LNDT 211 for the artifact to other nodes in NFV architecture system 400 and seek a certain level of agreement from nodes in each of Levels 1-5, Levels 1-6, or Levels 1-7. In one implementation, the required level of agreement (e.g., 90% agreement, 80% agreement, 50% agreement, etc.) may vary depending on the level associated with the artifact. For example, artifacts for lower levels (e.g., Level 1, Level, 2, Level 3) may require a higher level of agreement than higher levels (e.g., Level 6, Level 7).

Although FIG. 5 illustrates logical components of LNDT processor 401, in other implementations, LNDT processor 401 may include fewer, different, or additional logical components than depicted in FIG. 5. Additionally, or alternatively, one or more logical components of LNDT processor 401 may be performed by another device in NFV architecture system 400.

Figure 6:
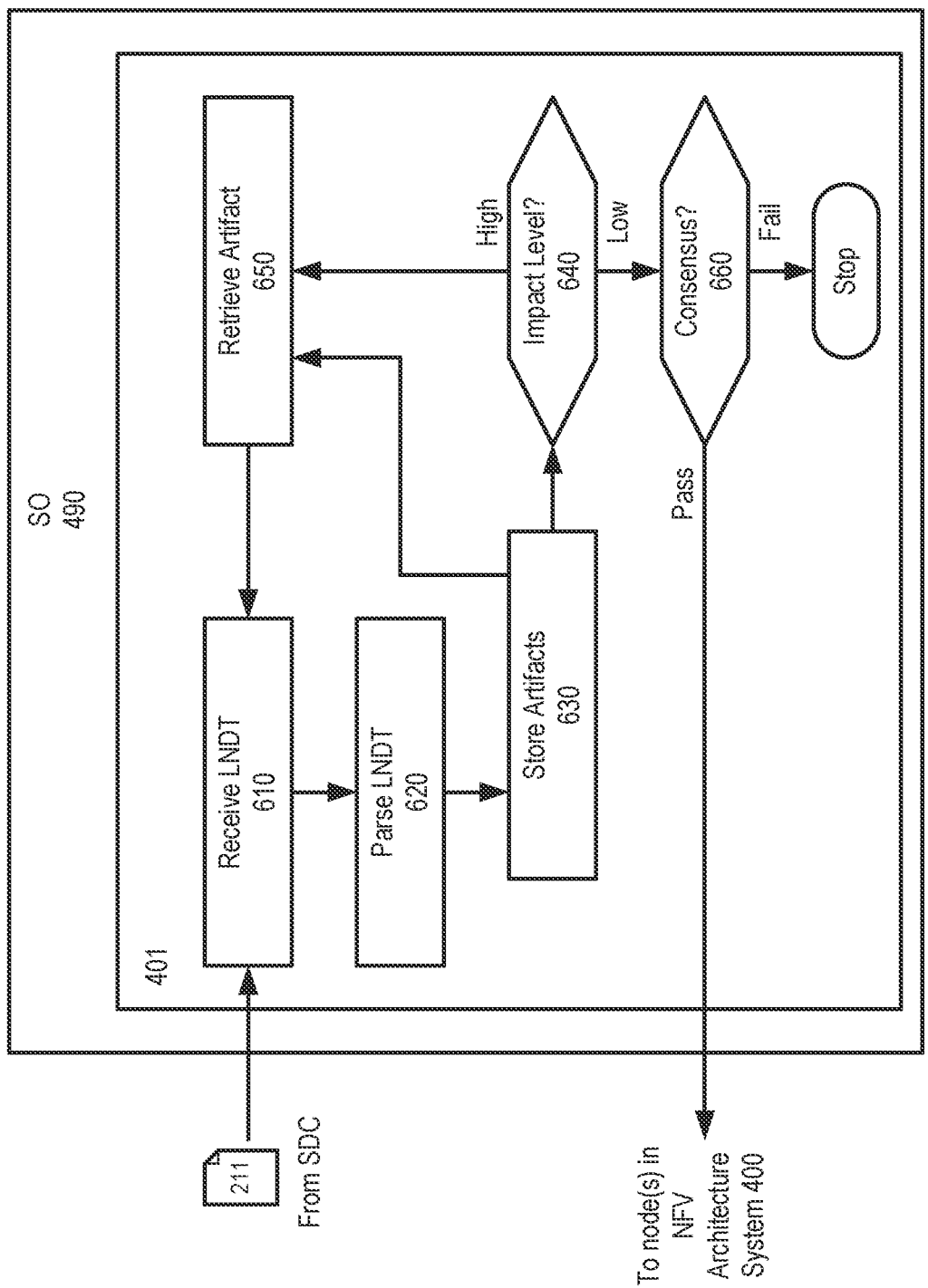
FIG. 6 is a diagram illustrating a process flow for a microservice performed by a LNDT processor, according to an implementation.

FIG. 6 is a diagram illustrating a process flow 600 for a microservice performed by LNDT processor 401. Process flow 600 may be performed, for example, by LNDT processor 401 in one or more of the network elements shown in FIG. 4.

Service orchestrator 490 may receive a LNDT 211 from SDC 480 and execute LNDT processor 401 for the NF deployment (block 610). LNDT processor 401 may parse LNDT 211 (block 620) and store the artifacts in a centralized graph database (block 630). For example, LNDT 211 may generate a graph topology based on link IDs and assigned levels for the artifacts in LNDT 211.

LNDT processor 401 may retrieve the artifact from the centralized graph database and analyze the impact of the artifact (block 640). For example, LNDT processor 401 may determine if there is potential impact to network performance. If an artifact is for Level 6 or Level 7, it may have low impact on network performance. If the artifact is level 5 or below it may have a higher impact on the network. Thus, other dependent configurations may need to be completed before configuring the higher impact artifact.

If the impact is high (block 640—High), LNDT processor 401 determines that the artifact has dependency on other configurations. Using head and tail links (e.g., in head link field 340 and tail link field 350), LNDT processor 401 may retrieve the corresponding artifacts from the centralized graph database and parse the linked artifacts, effectively repeating the process until a low impact is determined.

If the impact is low (block 640—Low), then service orchestrator 490 will attempt to obtain consensus from other nodes in NFV architecture system 400 (e.g., VNFs, orchestration tools, infrastructure, etc.) to configure the LNDT 211 (block 660). For example, if an artifact is Level 6 or above (e.g., as indicated in level field 330), the artifact may have low impact on network performance. If the artifact is level 6 or below (e.g., in level field 330), the artifact may have a higher impact on the network. Generally, service orchestrator 490 will need to process other dependent configurations before configuring higher impact artifacts. Service orchestrator 490 can obtain consensus from other systems in NFV architecture system 400 for a configuration decision. Any low-latency highly-secure consensus algorithm can be used.

If consensus is reached (block 660—Pass), then service orchestrator 490 may pass action to an action taker (e.g., generally any network function that takes action to deploy a network configuration, such as SO 490, NFVO 450, VNFM 460, EMS 424, VNF 426, etc.) in NFV architecture system 400 based on the level from LNDT 211 (e.g., in level field 330). The action-taking node may apply the configuration. In one implementation, the action-taking node may use LNDT processor 401 to process/confirm the configuration.

If consensus is not reached (block 660—Fail), then the configuration is not applied. Thus, artifact configurations that may result in a network outage or performance degradation can be mitigated.

Figure 7:
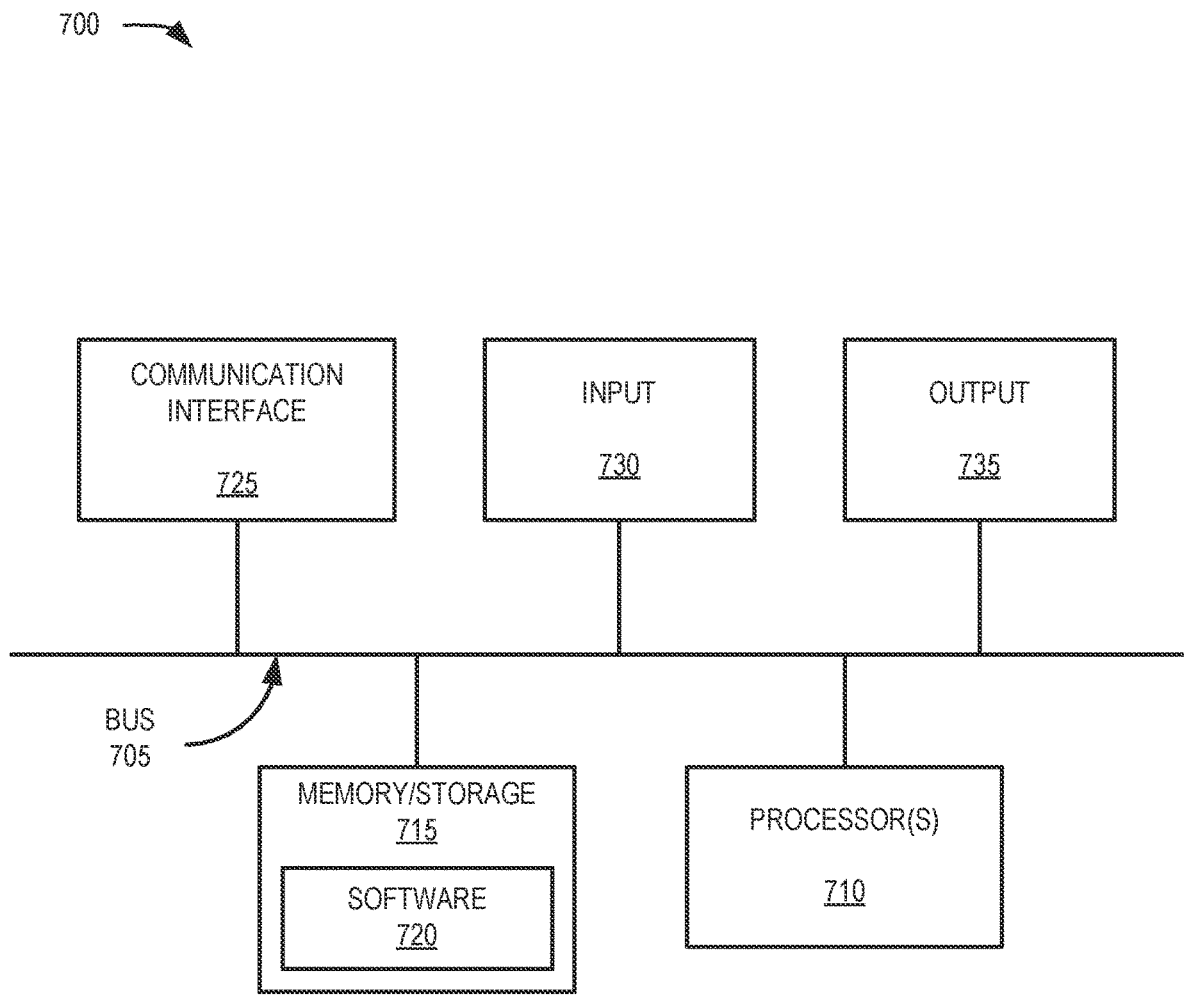
FIG. 7 is a diagram illustrating exemplary components of a device that may correspond to one or more of the devices described herein.

FIG. 7 is a diagram illustrating exemplary components of a device 700 that may correspond to one or more of the devices described herein. For example, device 700 may correspond to components included in access network 120, MEC network 140, core network 150, onboarding portal 160, service management platform 170, and/or other elements illustrated in FIGS. 1-5. As illustrated in FIG. 7, according to an exemplary embodiment, device 700 includes a bus 705, one or more processors 710, memory/storage 715 that stores software 720, a communication interface 725, an input 730, and an output 735. According to other embodiments, device 700 may include fewer components, additional components, different components, and/or a different arrangement of components than those illustrated in FIG. 7 and described herein.

Bus 705 includes a path that permits communication among the components of device 700. For example, bus 705 may include a system bus, an address bus, a data bus, and/or a control bus. Bus 705 may also include bus drivers, bus arbiters, bus interfaces, and/or clocks.

Processor 710 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 710 may be implemented as hardware (e.g., a microprocessor, etc.), a combination of hardware and software (e.g., a SoC, an ASIC, etc.), may include one or multiple memories (e.g., cache, etc.), etc. Processor 710 may be a dedicated component or a non-dedicated component (e.g., a shared resource).

Processor 710 may control the overall operation or a portion of operation(s) performed by device 700. Processor 710 may perform one or multiple operations based on an operating system and/or various applications or computer programs (e.g., software 720). Processor 710 may access instructions from memory/storage 715, from other components of device 700, and/or from a source external to device 700 (e.g., a network, another device, etc.). Processor 710 may perform an operation and/or a process based on various techniques including, for example, multithreading, parallel processing, pipelining, interleaving, etc.

Memory/storage 715 includes one or multiple memories and/or one or multiple other types of storage mediums. For example, memory/storage 715 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory (e.g., a NAND flash, a NOR flash, etc.), and/or some other type of memory. Memory/storage 715 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 715 may include a drive for reading from and writing to the storage medium.

Memory/storage 715 may be external to and/or removable from device 700, such as, for example, a Universal Serial Bus (USB) memory stick, a dongle, a hard disk, mass storage, off-line storage, network attached storage (NAS), or some other type of storing medium. Memory/storage 715 may store data, software, and/or instructions related to the operation of device 700.

Software 720 includes an application or a program that provides a function and/or a process. Software 720 may include an operating system. Software 720 is also intended to include firmware, middleware, microcode, hardware description language (HDL), and/or other forms of instruction. For example, according to an implementation, software 720 may implement portions of service management platform 170.

Communication interface 725 permits device 700 to communicate with other devices, networks, systems, devices, and/or the like. Communication interface 725 includes one or multiple wireless interfaces and/or wired interfaces. For example, communication interface 725 may include one or multiple transmitters and receivers, or transceivers (e.g., radio frequency transceivers). Communication interface 725 may include one or more antennas. For example, communication interface 725 may include an array of antennas. Communication interface 725 may operate according to a protocol stack and a communication standard. Communication interface 725 may include various processing logic or circuitry (e.g., multiplexing/de-multiplexing, filtering, amplifying, converting, error correction, etc.).

Input 730 permits an input into device 700. For example, input 730 may include a keyboard, a mouse, a display, a button, a switch, an input port, speech recognition logic, a biometric mechanism, a microphone, a visual and/or audio capturing device (e.g., a camera, etc.), and/or some other type of visual, auditory, tactile, etc., input component. Output 735 permits an output from device 700. For example, output 735 may include a speaker, a display, a light, an output port, and/or some other type of visual, auditory, tactile, etc., output component. According to some embodiments, input 730 and/or output 735 may be a device that is attachable to and removable from device 700.

Device 700 may perform a process and/or a function, as described herein, in response to processor 710 executing software 720 stored by memory/storage 715. By way of example, instructions may be read into memory/storage 715 from another memory/storage 715 (not shown) or read from another device (not shown) via communication interface 725. The instructions stored by memory/storage 715 cause processor 710 to perform a process described herein. Alternatively, for example, according to other implementations, device 700 performs a process described herein based on the execution of hardware (processor 710, etc.).

Figure 8:
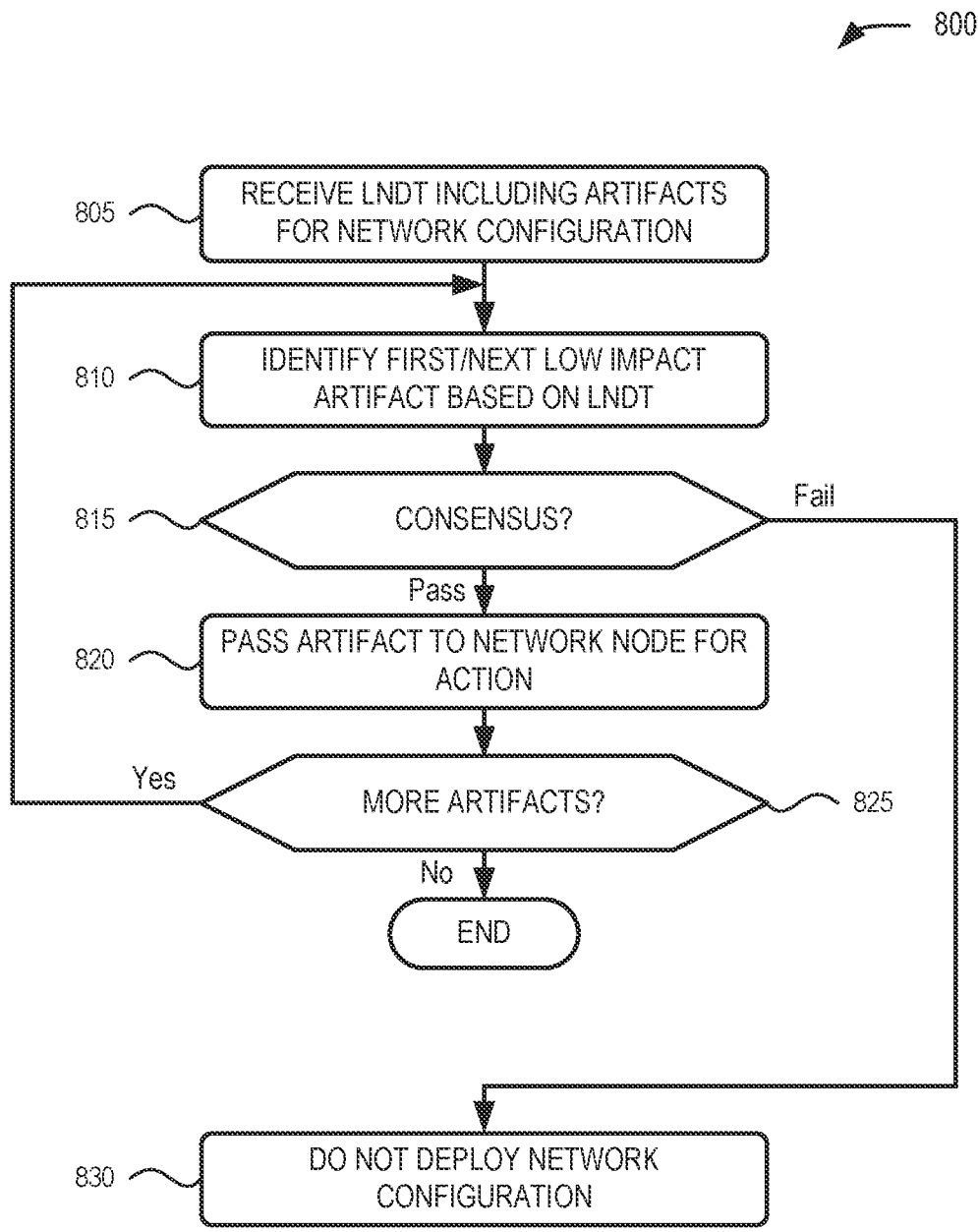
FIG. 8 is a flow diagram illustrating an exemplary process for performing an automated network configuration deployment, according to an implementation described herein.

FIG. 8 is a flow diagram illustrating an exemplary process 800 for performing an automated network configuration deployment, according to an implementation described herein. In one implementation, process 800 may be implemented by components of service management platform 170. In another implementation, process 700 may be implemented by service management platform 170 in conjunction with one or more other devices in network environment 100.

Process 800 may include receiving an LNDT including artifacts for network configuration (block 805) and identifying a first low impact artifact based on the LNDT (block 810). For example, a linked descriptor (e.g., LNDT 211) may be provided to service orchestrator 490 executing a LNDT processor 401. The linked descriptor may include fields described in connection with FIG. 2. The LNDT processor 401 may receive the linked descriptor and parse the file to associate artifacts with different network levels. The LNDT processor 401 (e.g., impact analyzer 540) may analyze the artifacts for impact levels (e.g., based on an entry in impact field 370 or other data) to identify low impact artifacts. The LNDT processor 401 (e.g., consensus manager 550) may obtain consensus for a configuration decision of the artifact from other systems in NFV architecture system 400.

If there is consensus (block 815—Pass), process 800 may include passing the artifact to a network node for action (block 820) and determining if there are other artifacts for the requested configuration (block 825). For example, after achieving consensus for a low-impact artifact, LNDT processor 401 may determine if additional artifacts are included in the LNDT 211. If there is no consensus (block 815—Fail), process 800 includes no deploying the network configuration (block 830). For example, LNDT processor 401 may prevent deployment of a network configuration package when an artifact does not achieve a required degree of consensus.

Systems and methods described herein enable a runtime orchestration platform to deploy network configurations without degrading network performance or causing a network outage. According to one implementation, a network device receives a linked descriptor (e.g., an LNDT) for deploying a network configuration in a network. The linked descriptor includes a first artifact associated with the network configuration, a unique artifact identifier for the first artifact, a network level identifier for the first artifact, and a link identifier of one or more second artifacts that are associated with the network configuration. The link identifier corresponds to a different network level than the network level identifier for the first artifact. The network device determines, based on information in the linked descriptor, if deployment of the first artifact will cause performance degradation in the network and prevents deployment of the network configuration if the artifact will cause performance degradation in the network.

The foregoing description of implementations provides illustration and description, but is not intended to be exhaustive or to limit the invention to the precise form disclosed. Modifications and variations are possible in light of the above teachings or may be acquired from practice of the invention. For example, while a series of blocks have been described with regard to FIGS. 6 and 8, the order of the blocks and operation flows may be modified in other embodiments. Further, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
receiving, by a network device, a linked descriptor for deploying a network configuration in a network, the linked descriptor identifying:
a first artifact associated with the network configuration,
a unique artifact identifier for the first artifact,
a network level identifier for the first artifact,
a link identifier of one or more second artifacts that are associated with the network configuration, wherein the link identifier corresponds to a different network level than a network level of the network level identifier for the first artifact, and
a link length indicating the total number of network levels impacted by the network configuration deployment;
determining, by the network device and based on information in the linked descriptor and consensus of each of the network levels in the link length, if deployment of the first artifact will cause performance degradation in the network; and
preventing deployment of the network configuration when deployment of the first artifact will cause performance degradation in the network.

2. The method of claim 1, wherein the determining includes:
identifying, based on the linked descriptor, that deploying the first artifact has a low network impact; and
requesting, from other nodes in each of the network levels impacted by the network configuration deployment, consensus to deploy the first artifact when deploying the first artifact has a low network impact.

3. The method of claim 1, wherein the determining includes:
identifying, based on the linked descriptor, that deploying the first artifact does not have a low network impact; and
retrieving, using information from the linked descriptor, the one or more second artifacts, wherein the one or more second artifacts have a different network level identifier than the first artifact.

4. The method of claim 3, wherein the determining further includes:
identifying, based on the linked descriptor, that deploying one of the one or more second artifacts has a low network impact; and
requesting, from other nodes in a Network Function Virtualization (NFV) architecture system, consensus to deploy the one of the one or more second artifacts when deploying the one of the one or more second artifacts has a low network impact.

5. The method of claim 1, further comprising:
passing, to another node in a Network Function Virtualization (NFV) architecture system an action to deploy the first artifact when deploying the first artifact will not cause performance degradation in the network.

6. The method of claim 1, further comprising:
parsing the linked descriptor, and
storing, in a memory, the first artifact associated with the unique artifact identifier and the one or more second artifacts associated with the link identifier.

7. The method of claim 1, further comprising:
generating, based on the linked descriptor, a graph topology for the first artifact and the one or more second artifacts.

8. The method of claim 1, wherein the first artifact includes a site-specific artifact.

9. The method of claim 1, wherein the network device includes a service orchestration device in a runtime environment.

10. A network device, comprising:
a processor configured to:
receive a linked descriptor for a deploying a network configuration in a network, the linked descriptor including:
a first artifact associated with the network configuration,
a unique artifact identifier for the first artifact,
a network level identifier for the first artifact,
a link identifier of one or more second artifacts that are associated with the network configuration, wherein the link identifier corresponds to a different network level than a network level of the network level identifier for the first artifact, and
a link length indicating the total number of network levels impacted by the network configuration deployment;
determine, based on information in the linked descriptor, if deployment of the first artifact will cause performance degradation in the network; and
prevent deployment of the network configuration when deployment of the first artifact will cause performance degradation in the network.

11. The network device of claim 10, wherein, when determining if deployment of the first artifact will cause performance degradation, the processor is further configured to:
identify, based on the linked descriptor, that deploying the first artifact has a low network impact; and
request, from other nodes in each of the network levels impacted by the network configuration deployment, consensus to deploy the first artifact when deploying the first artifact has a low network impact.

12. The network device of claim 10, wherein, when determining if deployment of the first artifact will cause performance degradation, the processor is further configured to:
identify, based on the linked descriptor, that deploying the first artifact does not have a low network impact; and
retrieve, using information from the linked descriptor, the one or more second artifacts, wherein the one or more second artifacts have a different network level identifier than the first artifact.

13. The network device of claim 10, wherein the processor is further configured to:
pass, to another node in a Network Function Virtualization (NFV) architecture system, an action to deploy the first artifact, when deploying the first artifact will not cause performance degradation in the network.

14. The network device of claim 10, wherein the processor is further configured to:
parse the linked descriptor, and
store, in a memory, the first artifact associated with the unique artifact identifier and the one or more second artifacts associated with the link identifier.

15. The network device of claim 10, wherein the first artifact includes a site-specific artifact.

16. The network device of claim 10, wherein the network device includes a service orchestration device in a runtime environment.

17. A non-transitory computer-readable medium containing instructions executable by at least one processor, the non-transitory computer-readable medium comprising one or more instructions for:
- receiving, by a network device, a linked descriptor for deploying a network configuration in a network, the linked descriptor including:
  - a first artifact associated with the network configuration,
  - a unique artifact identifier for the first artifact,
  - a network level identifier for the first artifact,
  - a link identifier of one or more second artifacts that are associated with the network configuration, wherein the link identifier corresponds to a different network level than a network level of the network level identifier for the first artifact, and
  - a link length indicating the total number of network levels impacted by the network configuration deployment;
- determining, by the network device and based on information in the linked descriptor and consensus of each of the network levels in the link length, if deployment of the first artifact will cause performance degradation in the network; and
- preventing deployment of the network configuration when deployment of the first artifact will cause performance degradation in the network.

18. The non-transitory computer-readable medium of claim 17, further comprising one or more instructions for:
- identifying, based on the linked descriptor, that deploying the first artifact has a low network impact; and
- requesting, from other nodes in each of the network levels impacted by the network configuration deployment, consensus to deploy the first artifact when deploying the first artifact has a low network impact.

19. The non-transitory computer-readable medium of claim 17, further comprising one or more instructions for:
- identifying, based on the linked descriptor, that deploying the first artifact does not have a low network impact; and
- retrieving, using information from the linked descriptor, the one or more second artifacts, wherein the one or more second artifacts have a different network level identifier than the first artifact.

20. The non-transitory computer-readable medium of claim 19, further comprising one or more instructions for:
- identifying, based on the linked descriptor, that deploying one of the one or more second artifacts has a low network impact; and
- requesting, from other nodes in a Network Function Virtualization (NFV) architecture system, consensus to deploy the one of the one or more second artifacts when deploying the one of the one or more second artifacts has a low network impact.

* * * * *